United States Patent
Arth et al.

[15] 3,673,180
[45] June 27, 1972

[54] 19-NOR-6,6-ETHYLENE-20-SPIROXENES

[72] Inventors: Glen E. Arth, Cranford; Gary H. Rasmusson, Watchung, both of N.J.

[73] Assignee: Merck & Co., Inc., Rahway, N.J.

[22] Filed: June 18, 1970

[21] Appl. No.: 47,606

[52] U.S. Cl..........260/239.55 R, 260/239.55 C, 260/397.4, 260/397.5, 260/999
[51] Int. Cl......................................................C07c 173/00
[58] Field of Search..................../Machine Searched Steroids

[56] References Cited
UNITED STATES PATENTS

| | | | |
|---|---|---|---|
| 3,422,097 | 1/1969 | Kerwin | 260/239.57 |
| 3,497,498 | 2/1970 | Georgian | 260/239.55 |

Primary Examiner—Henry A. French
Attorney—I. Louis Wolk, J. Jerome Behan and Hesna J. Pfeiffer

[57] ABSTRACT

Novel 19-nor-6,6-ethylene-3-oxo-20-spirox-4-enes (or 4,14-dienes) are provided, prepared from the corresponding 19-nor-3-oxo-spirox-4-enes (or 4,14-dienes). The compounds are useful as orally-effective antiestrogens, and are also anabolic agents having low androgenicity.

10 Claims, No Drawings

19-NOR-6,6-ETHYLENE-20-SPIROXENES

BACKGROUND OF THE INVENTION

Novel 19-nor-6,6-ethylene-3-oxo-20-spirox-4-enes (or 4,14-dienes) are provided, prepared from the corresponding 19-nor-3-oxo-spirox-4-enes (or 4,14-dienes). The compounds are useful as orally-effective antiestrogens, and are also anabolic agents having low androgenicity.

DESCRIPTION OF THE PRIOR ART

U. S. Patent 3,422,097 describes 19-nor-6,6-ethylene-spirolactones, disclosed as having androgenic and anabolic activity. It is desirable, however, to provide compounds in which the anabolic activity is high and the androgenic activity is low to prevent undesirable side-effects accompanying the use of an androgenic product.

SUMMARY OF THE INVENTION

The compounds of the present invention are 19-nor-3-oxo-6,6-ethylene-20-spirox-4-enes which possess a high anabolic/androgenic ratio. This high anabolic/androgenic ratio is surprising, in light of the prior art teachings of other compounds in the series. In addition, the compounds possess a potent antiestrogen effect and are orally active as antiestrogens or as anabolic compounds. This latter high oral activity in the spiroxene series has heretofore been relatively low. The specific utility of these compounds is to antagonize the uterine growth stimulating activity of estrone and compounds of estrone-like activity. A further use is as anabolic compounds in animals and humans.

The compounds of the present invention can be prepared using the following general synthesis:

Flow Sheet I

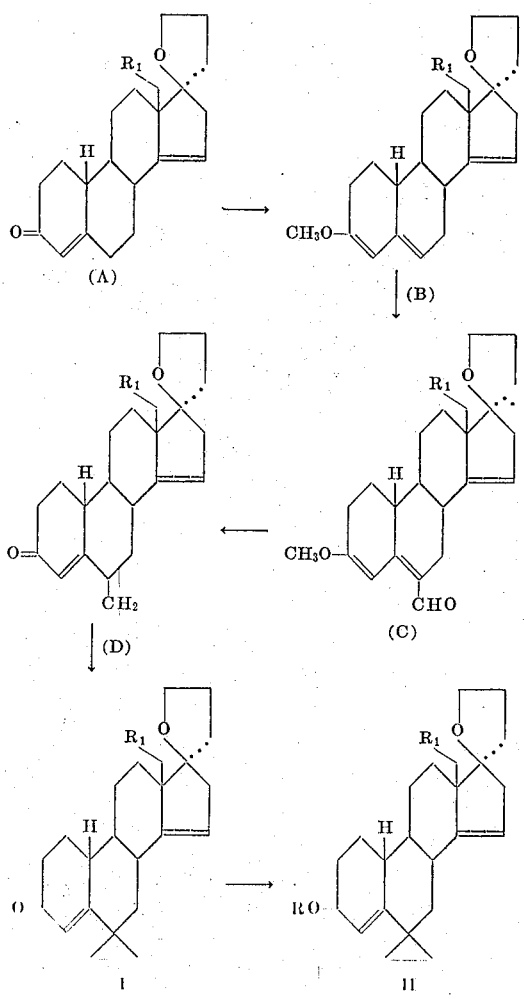

In the above scheme, Compounds I and II are the desired end-products. $R_1$ is either H or $CH_3$; the broken line is an optional double bond. In Compound II, R represents hydrogen, loweralkyl having one to six carbon atoms, loweralkanoyl having one to six carbon atoms, or tetrahydropyranyl or tetrahydrofuranyl.

The process used to prepare the compounds of this invention employs as its starting material the Compound A, 19-nor-20-spirox-4-en-3-one or 19-nor-20-spirox-4,14-dien-3-one. The starting compound is first converted to a 3-enol ether (Compound B) by treatment with a triloweralkyl orthoformate such as trimethyl or triethyl orthoformate in the corresponding alcohol solvent in the presence of an acid catalyst such as 2,4-dinitrobenzene sulfonic acid. The resulting 3-methoxy (or ethoxy) 3,5-diene (or 3,5,14-triene) is formylated at the 6-position by treatment with the Vilsmeier reagent. This reagent, which consists of phosgene or phosphonyl chloride and dimethylformamide, reacts in an anhydrous medium with the diene at position-6 to give an iminium intermediate which is then hydrolyzed in acid to the 6-formyl compound (C). The formyl group is then reduced either by catalytic means or by lithium aluminum hydride or sodium borohydride to give a 6-hydroxymethyl compound and then dehydrated with a reagent such as glacial acetic acid, p-toluene sulfonic acid, or sulfuric acid to give the 6-methylene compound (D). Compound I is formed by means of a reagent which is capable of adding a methylene group across the 6-methylene double bond. A suitable reagent is dimethyl sulfoxonium methylide, which is formed in situ by reaction of dimethyl sulfoxide methiodide with a strong base such as sodium hydride. An alternate process utilizes diazomethane to add a pyrozolinyl group at 6, followed by pyrolysis to produce the 6,6-ethylene substituent.

Further product compounds of the invention, Compound II, can be prepared by alkylating or alkanoylating a 3-hydroxyl group. The 3-keto group is first reduced using, for example, sodium borohydride in methanol at 0° up to the boiling point of methanol. The 3-ol group can be used without further reaction or can be converted to an ether or ester by one of several procedures.

For instance, Compound II can be treated with a strong base such as alkali metal alkyls or alkali metal hydrides, e.g., methyl lithium, sodium hydride and the like, forming the alkoxide. This is followed by addition of a loweralkyl sulfate or loweralkyl halide leading to loweralkyl ethers of II (R=H). If an ester is preferred, a suitable reagent such as a loweralkanoyl anhydride or a loweralkanoyl chloride, is allowed to react with II (R=H) in a basic medium such as pyridine or a trialkylamine in an inert solvent such as ether or benzene.

Where the R group in Compound II is a heterocycloalkoxy group such as the tetrahydropyranyl or the tetrahydrofuranyl groups, a different mode of synthesis is used. The allylic alcohol is treated with the desired heterocycloalkene such as dihydropyran or dihydrofuran in the presence of an acyl halide or anhydrous mineral acid. The more preferred acyl halides include an aryl sulfonyl halide such as benzene sulfonyl chloride or p-toluene sulfonyl chloride.

When the chosen starting material in Flow Sheet I is the 4,14-dien-3-one compound, it can be prepared using the following novel reaction synthesis shown in Flow Sheet II. The starting compound in this synthesis is the ethylene ketal of estrone loweralkyl, preferably methyl, ether (Compound F), which is brominated at position-16 using pyridinium bromide perbromide. In general, the bromination reaction takes place in an inert organic solvent at low temperatures (0°–25° C.). The estrone ether and the perbromide are employed in approximately equimolar amounts.

In the next step of the reaction, the 16-bromo derivative (G) is dehydrobrominated to the $\Delta^{15}$ Compound (H). This dehydrobromination reaction is effected by refluxing in a high boiling solvent (i.e., about 120°–200° C.) in the presence of an alkali metal alkoxide, e.g., potassium-t-butoxide. The mixture is refluxed for several hours, cooled, and the product extracted with an aromatic hydrocarbon. After evaporation and recrystallization, the product H is recovered.

In the third step, the 17,17-ethylene dioxy group of H is transformed to the 17-keto derivative (J), by means of dilute acid, such as p-toluene sulfonic acid, in an aqueous-organic solvent mixture. The organic solvent is preferably acetone. The product J is recovered after concentration and filtration.

Compound J is then converted to the 17-acetoxy-1,3,5(10),14,16-pentaene derivative (K) by treatment with p-toluene sulfonic acid and acetic anhydride. The pentaene K is then reduced to the tetraene-17-ol Compound L. The reduction conditions utilize sodium borohydride in aqueous alcohol, preferably methanol or ethanol. Excess hydride is neutralized by the addition of acid such as glacial acetic acid. The product (L) is recovered by the concentration of organic solvent extracts.

The alcohol group at 17 of Compound L is then selectively oxidized to the 17-keto derivative (M). A suitable oxidation system is a dipyridine-chromium VI complex in a solvent such as methylene chloride. The oxidation proceeds rapidly at room temperature.

Compound M is then treated with allyl magnesium chloride in ether to yield the 17β-hydroxy-17α-allyl Compound (N). The reaction proceeds within 1–2 hours or less at room temperature. The 17α-allyl substituent is transformed to the 17α-(3′-hydroxypropyl)-17β-hydroxy Compound (O). An excess of diborane in an organic solvent (suitably tetrahydrofuran) in the presence of 2-methyl-2-butene is first employed at low temperatures (−20° to 0° C.). The reaction mixture is then made basic, suitably with NaOH; then hydrogen peroxide is added and the mixture allowed to stand 8–12 hours at room temperature. The product Compound (O) is a key intermediate. By reference to the Flow Sheet, it can be seen that it can be treated following at least two separate processes to yield the desired Δ⁴ ¹⁴ spiroxenone (Compound A).

The first process of reaction Compound O is a three-step procedure via Compounds (P) and (Q). The first step, yielding Compound P, is a Birch reduction using metallic lithium and t-butanol in a solvent mixture of liquid ammonia and diethyl ether. After refluxing for 3–4 hours, the product (P) is separated and suspended in alcohol. The suspension is acidified with HCl and stirred at room temperature. After about 20–24 hours, the mixture is neutralized and the product Compound Q recovered. The final step is the ring closure of the spiroxa ring using p-toluene sulfonyl chloride in pyridine.

Alternatively, Compound Q can first be converted to the spiroxene by closing the 17β-hydroxy-17α-(3′-hydroxypropyl) substituents using p-toluene sulfonyl chloride in pyridine, followed by the Birch reduction and acid-catalyzed hydrolysis to yield the final desired Δ⁴ ¹⁴ spiroxenone, Compound A.

Although the above reaction sequence is illustrated using the 3-methoxy ether of the starting compound, other loweralkoxy compounds could be used with equal success. Loweralkoxy is used to mean all alkoxy groups having one to six carbon atoms.

0015

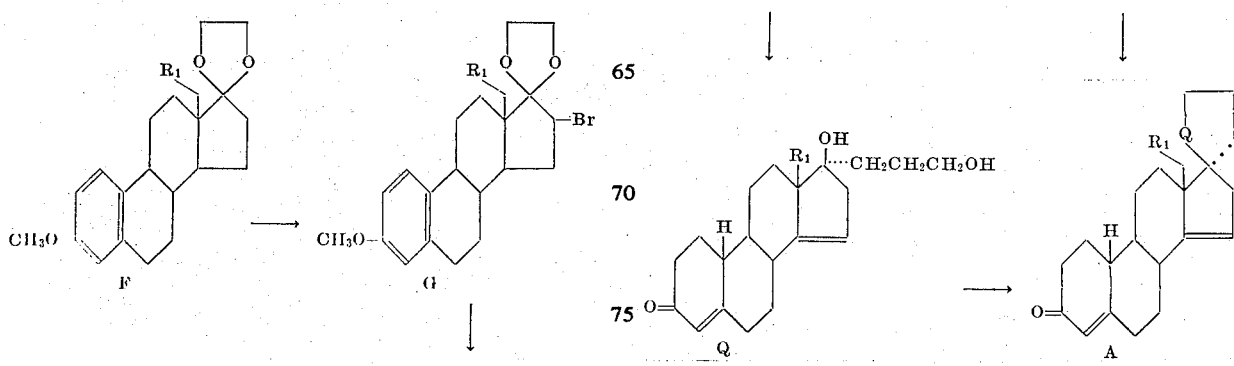

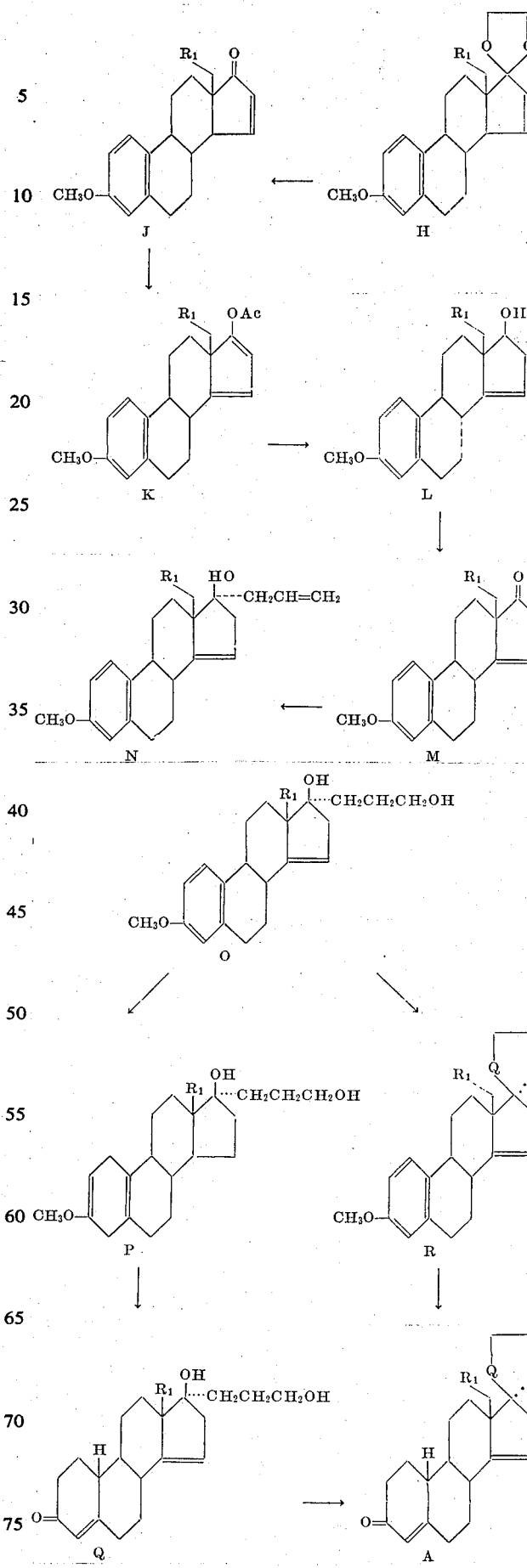

The 6,6-ethylene-spiroxene compounds of the invention, having a high anabolic/androgenic ratio are useful when it is desired to increase body weight and build muscle tissue without stimulating an androgenic response. In addition, the compound 19-nor-20-spirox-4-en-3-one possess a high degree of oral estrogen antagonist activity.

The following examples are used to illustrate the invention. Various obvious modifications will occur to those skilled in the art, and those modifications are to be considered part of the invention.

EXAMPLE 1
3-Methoxy-19-nor-20-spiroxa-3,5-diene

A solution of 2.4 g. of 19-nor-20-spirox-4-en-3-one in 55 ml. of methanol is prepared by heating the solvent slightly during addition of the steroid. The solution is then cooled to 0° C. 275 Mg. of 2,4-dinitrobenzene sulfonic acid and 5.5 cc. of trimethyl orthoformate is then added and stirred for 10 minutes. Pyridine is then added (16 drops) and 55 ml. of water is also added dropwise. Precipitation of the product occurs readily. The precipitate is filtered and dried. Following recrystallization from methanol containing a small amount of pyridine, the product, 3-methoxy-19-nor-20-spiroxa-3,5-diene, is obtained, m.p. 94°–97° C.

EXAMPLE 2
3-Methoxy-6-formyl-19-nor-20-spiroxa-3,5-diene

The steroid (200 mg.) prepared in Example 1 in 2 ml. of methylene chloride containing a small amount of pyridine (.1 ml. of pyridine to 40 ml. of methylene chloride) is stirred at 0° C.

A solution of Vilsmeier reagent had been previously prepared at 0° from 2.8 cc. of phosphoryl chloride (redistilled) and 8.3 ml. of dimethylformamide in 25 ml. of methylene chloride. 1.2 Ml. of this Vilsmeier reagent is added to the steroid solution. The resulting solution is stirred at 0° C. for 2 hours.

20 percent Aqueous sodium acetate (2 ml.) is added and stirring continued for 15 minutes at room temperature. Diethyl ether is added and the organic layer separated. After washing with a 10% NaHCO₃ solution and water, the organic fraction is dried and concentrated down to a residue of the product.

After recrystallization from diethyl ether, the product, 3-methoxy-6-formyl-19-nor-20-spiroxa-3,5-diene, m.p. 114°–120° C., is recovered.

EXAMPLE 3
6-Methylene-19-nor-20-spirox-4-en-3-one

125 Mg. of lithium aluminum hydride is stirred in 5 cc. of ether at 0° C. The 3-methoxy-6-formyl-19-nor-20-spiroxa-3,5-diene (1.0 g.) dissolved in 15 cc. of dry tetrahydrofuran is added. After stirring at 0° C. for 10 minutes, the mixture is added to 100 ml. of a 2.5 N hydrochloric acid solution. The stirring is continued at room temperature for one-half hour.

A precipitate is formed gradually and is filtered and recovered. The rest of the product is extracted from the aqueous solution with ether. The ether extracts are combined and washed with sodium bicarbonate solution, then water, and dried and the solvent evaporated. The crude product fractions are combined and used without further purification in the next example.

EXAMPLE 4
6,6-Ethylene-19-nor-20-spirox-4-en-3-one

In a dry 2-neck round-bottom flask is placed 1.28 grams of dimethyl sulfoxide methiodide dissolved in 22.5 ml. of dry dimethyl sulfoxide. 275 Mg. of sodium hydride is added and the solution stirred vigorously under nitrogen for one-half hour until the solution is clear.

The 6-methylene steroid prepared in Example 3, approximately 1 g., is added to the reagent after dissolving in 15 ml. of tetrahydrofuran. The mixture is stirred for 20 minutes.

The reaction is quenched by the addition of water and the product is extracted with ether. The exter extract is washed with water, dried, and concentrated. A crude product is obtained which is purified by chromatography over silica gel. It is first eluted with benzene then with increased percentages of diethyl ether in benzene, up to 10 percent ether in benzene. After recrystallization from ether/pentane, the product, 6,6-ethylene-19-nor-20-spirox-4-en-3-one, is obtained, m.p. 85°–86 C.

EXAMPLE 5
6,6-Ethylene-19-nor-20-spirox-4-en-3-one a. Preparation of diazomethane Alcohol-free diazomethane is first prepared by adding 2-(2-ethoxyethoxy)-1-ethanol (105 ml.) and 60 ml. of diethylether to a solution of 18 g. of KOH in 30 ml. of water. This solution is placed in a 500 ml. of 3-necked reaction flask fitted with dropping funnel, efficient condenser and water bath. The receiving flask is connected with second flask containing 30 ml. of diethylether. Both are cooled to 0° C. The inlet tube of the second receiver is dipped below the surface of the ether. The water bath is then heated to 70° C. As distillation of the ether started, a solution of 64.5 g. of p-tolylsulfonyl-methylnitrosamide in about 600 ml. of diethylether is added through the dropping funnel over a period of 3 hours. When the dropping funnel is empty, another 50 ml. of ether are added slowly and distillation continued until the distillate is colorless. The combined ethereal distillate contains about 9 g. of diazomethanol which is dried over KOH, and used as a solution in the next step.

b. 3-Oxo-19-nor-spiro(20-spirox-4-en-6,3'-1-pyrazoline)

To the diazomethane solution prepared above is added 4.5 g. of the 6-methylene compound of Example 3. The solution is stirred at room temperature for 18 hours. The excess diazomethane is then distilled off to a flask containing acetic acid. The solid product is dried under vacuum, and the yield is calculated to be almost quantitative. A small portion is recrystallized from diethylether, m.p. 220°–225° C. The remainder of the product, 3-oxo-19-nor-spiro(20-spirox-4-en-6,3'-1-pyrazoline), is used without purification in the next step.

c. 6,6-Ethylene-19-nor-20-spirox-4-en-3-one

The above pyrazoline compound is heated in a sublimator at high vacuum at 230°–250° C. for 1 hour. The product is collected on the cold finger of the sublimator.

The crude product is purified by column chromatography. It is passed through a column packed with silica gel, and eluted first with benzene, then with increase percentage of diethylether in benzene, up to 10 percent ether in benzene.

2.4 G. of product is obtained. After recrystallization from heptane, the melting point of the product, 6,6-ethylene-19-nor-20-spirox-4-en-3-one, is 86°–87° C.

EXAMPLE 6
6,6-Ethylene-19-nor-20-spirox-4-en-3-ol

10 G. of 6,6-ethylene-19-nor-20-spirox-4-en-3-one as prepared in Example 4 or Example 5 is dissolved in 350 ml. of methanol. To this solution is added 3.8 g. of sodium borohydride in 15 ml. of cold water. The addition is carried out during 5 minutes at 0° C. with stirring and the reaction mixture is then allowed to come to room temperature over a period of 2 hours. The reaction mixture is quenched by allowing to cool to room temperature and is poured into water and filtered. The filtered reaction is washed with water, dried, and recrystallized from ether to give 6,6-ethylene-19-nor-20-spirox-4-en-3-ol.

EXAMPLE 7
3-Ethoxy-6,6-ethylene-19-nor-20-spirox-4-ene

A solution of 5.3 g. of the 3-ol steroid prepared in Example 6 is prepared in 250 ml. of dry dimethoxy ethane, cooled to 0° C., and treated with a solution of 1.6 N methyl lithium in ether until no further evolution of a gas is noted. The resulting solution is stirred at about 0° C. for about 10 minutes and then treated with 25 ml. of ethyl bromide. The temperature of the solution is permitted to rise to ambient temperature and stirred for about 16 hours. The reaction is quenched by the addition of 25 g. of solid sodium bicarbonate followed by 250 ml. of water. The resulting suspension is stirred for a further 10 hours and concentrated under reduced pressure to remove the bulk of the organic solvent. The The residual aqueous mixture is extracted with ether. The ether layer is washed and dried and concentrated to yield a solid product. Recrystallization from methanol yields 3-ethoxy-6,6-ethylene-19-nor-20-spirox-4-ene, the desired product.

In accordance with the above procedure but where in place of ethyl bromide there is utilized dimethyl sulfate or butyl bromide, the products 3-methoxy-6,6-ethylene-19-nor-20-spirox-4-ene, or 3-butoxy-6,6ethylene-19-nor-20-spirox-4-ene are obtained.

EXAMPLE 8
3-Tetrahydropyranyloxy-6,6-ethylene-19-nor-20-spirox-4-ene

A solution of 115 mg. of the 3-hydroxy steroid prepared in Example 6 in 1 ml. of redistilled dihydropyran, and 25 mg. of p-toluene sulfonyl chloride is prepared. The mixture is stirred at ambient temperature for 22 hours. 0.25 Ml. of pyridine are added and the mixture concentrated under reduced pressure to remove excess dihydropyran. The residue is stirred for one hour with 1.5 ml. of 5 percent aqueous sodium bicarbonate and the mixture extracted with chloroform. The chloroform layer is separated, washed with water, and dried under sodium sulfate and concentrated to yield a residue. Trituration of the residue with pentane yields 3-tetrahydropyranyloxy-6,6-ethylene-19-nor-20-spirox-4-ene.

In accordance with following the procedure above but where in place of dihydropyran there is utilized dihydrofuran, there is obtained 3-tetrahydrofuranyloxy-6,6-ethylene-19-nor-20-spirox-4-ene.

EXAMPLE 9
16-Bromo-17,17-ethylenedioxy-3-methoxyestra-1,3,5(10)-triene

To a solution of 34 g. (0.104 mole) of the ethylene ketal of estrone methyl ether in 1,100 ml. of tetrahydrofuran is added with stirring at 0°, 35.5 g., (0.11 mole) of pyridinium bromide perbromide in portions over 5 minutes. The mixture is stirred at 0° for one hour, the orange bromine color being replaced by yellow. The insoluble material is removed by filtration and the filtrate is concentrated to about 100 ml. It is then added to an excess of 5% sodium bicarbonate solution with stirring. The separated product is isolated by filtration and washed well with water. After drying under reduced pressure the solid is recrystallized from ethyl acetate to give 29.1 g. of prisms, m.p. 191°–195°, second crop is 3.25 g., m.p. 185°–191°. The product is identified as 16-bromo-17,17-ethylenedioxy-3-methoxyestra-1,3,5(10) - triene.

EXAMPLE 10
17,17-Ethylenedioxy-3-methoxyestra-1,3,5( 10),15-tetraene

A suspension of 113 g. of freshly prepared potassium t-butoxide in 1,500 ml. of xylene is heated until 250 ml. of the solvent is removed. The bromoketal prepared in Example 9 (32.3 g., 0.079 mole) is added and the mixture refluxed under nitrogen for 18 hours. After cooling to room temperature 500 g. of ice is added to the reaction mixture. The phases are separated and the aqueous phase extracted with benzene. The combined organic phases are washed well with water, then with saturated sodium chloride solution and dried. Concentration gives a pink crystalline residue which on separation from ethanol yields 22.8 g. of plates, m.p. 122°–123.5°, identified as 17,17-ethylenedioxy-eh-methoxyestra-1,3,5(10),15-tetraene.

EXAMPLE 11
3-Methoxyestra-1,3,5(10),15tetraene-17-one

A solution of 10 g. (0.031 mole) of the ketal prepared in Example 10 and 500 mg. of p-toluene sulfonic acid hydrate in a mixture of 750 ml. of acetone and 125 ml. of water is stirred at room temperature for 105 minutes. It is then treated with 800 mg. of sodium bicarbonate. After concentration of the mixture under reduced pressure to about one-half of its original volume it is diluted with one liter of saturated sodium chloride solution. The separated product is isolated by filtration, washed well with water and then dried. Recrystallization from 900 ml. of heptane gives 6.7 g. of heavy prisms, m.p. 176°–179°. Further recrystallization yielded 5.02 g. of 3-methoxyestra-1,3,5(10),15-tetraene-17-one, m.p. 180°–182°.

EXAMPLE 12
17-Acetoxy-3-methoxyestra-1,3,5(10),14,16-pentaene

To a solution of 690 mg. (2.44 mmoles) of the enone prepared in Example 11 in 20 ml. of acetic anhydride is added 120 mg. of p-toluene sulfonic acid. The mixture is stirred at room temperature overnight and then concentrated under reduced pressure (100 mm) at 90° to about one-third of its original volume. The remaining anhydride is removed by treatment with a saturated solution of sodium bicarbonate. The product is extracted into diethyl ether and worked up to give a crystalline, colored residue. Recrystallization from methanol gives 465 mg. of the product, 17-acetoxy-3-methoxyestra-1,3,5(10),14,16-pentaene.

EXAMPLE 13
3-Methoxyestra-1,3,5(10),14-tetraene-17$\beta$-ol

To a solution of 1.367 g. (4.2 mmoles) of the enol acetate prepared in Example 12 in 75 ml. of ethanol is added at 0° a solution of 825 mg. of sodium borohydride in 75 ml. of ethanol-water (10:3). The mixture is kept at 5°–10° for 16 hours and then at room temperature for 4 hours. Glacial acetic acid is added to neutralize the excess hydride and the resulting mixture concentrated to near dryness under reduced pressure. The residue is extracted with ethylacetate and the resulting extract is washed, dried and concentrated to give a glass which crystallized on trituration with alcohol. Recrystallization from isopropanol yields 982 mg. of fine needles, m.p. 112°–114°. The product is identified as 3-methoxyestra-1,3,5(10),14-tetraen-17$\beta$-ol.

EXAMPLE 14
3Methoxyestra-1,3,5(10),14-tetraen-17-one

A solution of 9.3 g. (0.0328 mole) of 3-methoxyestra-1,3,5(10),14-tetraen-17$\beta$-ol prepared as in Example 13 in 300 ml. of methylene chloride is added at a rapid dropwise rate to a stirred suspension of 46.5 g. (0.18 mole) of dipyridine-chromium (VI) complex in 800 ml. of methylene chloride at room temperature. The mixture is stirred 45 minutes and then filtered. The residue is washed with ethyl acetate and the organic layers are combined. Water is added to the filtrates and sufficient ethyl acetate is added to make the organic layer less dense than water. After the organic layer is washed with water, it is dried over sodium sulfate and concentrated to leave ~10 g. of crystalline residue. Recrystallization from methanol gives 7 g. of the desired 3-methoxyestra-1,3,5(10),14-tetraen-17-one, m.p. 98°–100°.

EXAMPLE 15
3-Methoxyestra-1,3,5(10),14-tetraen-17$\alpha$-allyl-17$\beta$-ol 5.3 G. of the steroid prepared in Example 14 is dissolved in 268 ml. of diethyl ether and cooled to 0° C. 150 Ml. of 3M allylmagnesium chloride in tetrahydrofuran is added and the mixture stirred at room temperature for 1 hour. The solution is quenched with ammonium chloride and extracted with ethyl acetate, then washed with water. After drying and evaporating, a yellow oil is obtained which weighs 8.6 g. Recrystallization from methanol yields a white crystalline solid. 4.0 G. of the product, 3-methoxyestra-1,3,5(10),14-tetraen-17$\alpha$-allyl-17$\beta$-ol, is recovered.

EXAMPLE 16
3-Methoxyestra-1,3,5(10),14-tetraen-17$\alpha$-(3'-hydroxypropyl)-17$\beta$-ol A dry flask under $N_2$ atmosphere is prepared for reaction by adding 14 ml. of 1M diborane (20 percent excess) in 14 ml. distilled tetrahydrofuran. The vessel and contents are cooled to −20° C. and 5 ml. of 2-methyl-2-butene in 5 ml. of tetrahydrofuran is added and stirred for one-half hour. The temperature is maintained at −20° C. To the flask is added 4.0 g. of the allylic alcohol steroid prepared in Example 15 in 20 ml. of tetrahydrofuran. The flask is stirred at 0° C. for 2 hours. After cooling to −20° C., 14 ml. of 3N NaOH is added slowly. The reaction mixture foams and when foaming ceases, 14 ml.

diethyl ether is added to the reaction flask. The mixture is extracted with methylene chloride, washed with water, dried and evaporated. A white crystalline powder melting at 156°–158° C. is recrystallized from methanol, which is identified as 3-methoxyestra-2,5(10),14-trien-17α-(3′-hydroxy-propyl)-17β-ol.

EXAMPLE 18
Estra-4,14-dien-17α-(3′-hydroxypropyl)-17β-ol-3-one

100 Mg. of the powder prepared in Example 17 is suspended in 3.3 ml. of ethanol in a separate reaction flask. 0.4 Ml. of a 2.5 N hydrochloric acid solution is then added and the reaction stirred at room temperature. After 24 hours, it is neutralized with aqueous sodium bicarbonate. The ethanol is removed by evaporation and the residue is crystallized, filtered, and dried, and the product was identified as estra-4,14-dien-17α-(3′-hydroxypropyl-17β-ol-3-one, m.p. 185°–187° C.

EXAMPLE 19
19-Nor-20-spiroxa-4,14-dien-3-one

820 Mg. of the diol prepared in Example 18 is dissolved in 8 cc. of pyridine and cooled to 0° C. To this solution is added 820 mg. of p-toluenesulfonyl chloride and the mixture stirred at room temperature overnight. The solution is diluted slowly with water and an oily substance is separated. This oil, after extraction with ethyl acetate and washing with water, is dried and evaporated yielding 731 mg. of a dark oil. The oil is purified by thin layer chromatography on a silica gel with a 2 percent methanol/chloroform eluant. The product is taken up in benzene and recrystallized from a 10 percent ethanol/benzene mixture. Mass spectograph analysis indicates that the product, 19-nor-20-spiroxa-4,14-dien-3-one, is prepared, melting at 72°–74 C.

EXAMPLE 20
3-Methoxy-19-nor-20-spiroxa-1,3,5(10),14-tetraene

800 Mg. of the diol prepared in Example 16 is dissolved in 8 cc. of pyridine and cooled to 0° C. To this solution is added 800 mg. of p-toluenesulfonyl chloride and the mixture stirred at room temperature overnight. The solution is then diluted with water. The crude product is recovered as an oil, which after purification and recrystallization, is identified as 3-methoxy-19-nor-20-spiroxa-1,3,5(10),14-tetraene.

EXAMPLE 21
19-Nor-20-spiroxa-4,14-dien-3-one

The product prepared in Example 20 is treated with anhydrous ammonia and solid lithium in t-butanol following the procedure of Example 17. The product obtained is 19-nor-20-spiroxa-3-methoxy-2,5(10),14-triene. This latter product is then treated with acid following the procedure of Example 18 to yield the 19-nor-20-spiroxa-4,14-dien-3-one final product, m.p. 72°–74° C.

What is claimed is:
1. A compound having the formula of 30 percent aqueous $H_2O_2$ is added. The mixture is allowed to stand overnight at room temperature. The reaction is quenched by dilution with water and the tetrahydrofuran is evaporated under vacuum. The residue is crystallized, filtered, and purified. 2.4 G. of 3-methoxyestra-1,3,5(10),14-tetraen-17α-(3′-hydroxypropyl)-17β-ol is recovered. The product is used in the next step without further identification.

EXAMPLE 17
3Methoxyestra-2,5(10),14-trien-17α-(3′-hydroxypropyl)-17β-ol

To a dry flask equipped with a Dry Ice condenser and magnetic stirrer device under a $N_2$ atmosphere is added 0.5 g. of the steroid (prepared in Example 16) suspended in 7 ml. of t-butanol and 7 ml. of diethyl ether. 20 Ml. of anhydrous liquid ammonia is added to the flask. Sufficient solid lithium wire is then added to turn the solution dark blue. The mixture is refluxed for 3–4 hours. Methanol is added to quench the reaction and the ammonia allowed to evaporate overnight under the $N_2$ stream. At this point, 25 ml. of water and 25 ml. of

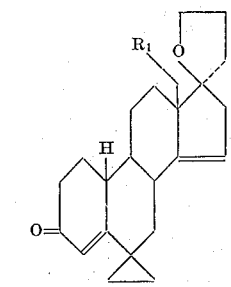

wherein the broken line indicates an optional double bond, and $R_1$ is either H or $CH_3$.

2. The compound of claim 1 which is 19-nor-20-spirox-6,6-ethylene-4-en-3-one.

3. The compound which is 19-nor-20-spirox-6,6-ethylene-4,14-dien-3-one.

4. A compound having the formula

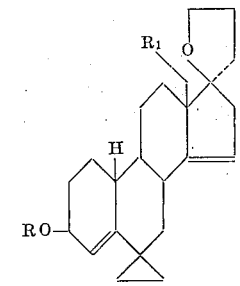

wherein R is hydrogen, loweralkyl having one to six carbon atoms, loweralkanoyl having one to six carbon atoms, tetrahydropyranyl, or tetrahydrofuranyl, $R_1$ is either H or $CH_3$, and the broken line indicates an optional double bond.

5. The compound of claim 4 which is 6,6-ethylene-19-nor-20-spirox-4-en-3-OR, where R is hydrogen, loweralkyl having one to six carbon atoms, loweralkanoyl having one to six carbon atoms, tetrahydropyranyl, or tetrahydrofuranyl.

6. The compound which is 6,6-ethylene-19-nor-20-spirox-4,14-dien-3-OR, where R is hydrogen, lower alkyl having one to six carbon atoms, loweralkanoyl having one to six carbon atoms, tetrahydropyranyl, or tetrahydrofuranyl.

7. The compound of claim 4 wherein R is hydrogen.

8. The compound of claim 4 wherein R is methyl.

9. The compound of claim 4 wherein R is acetyl.

10. The compound of claim 4 wherein R is tetrahydropyranyl.

* * * * *

UNITED STATES PATENT OFFICE
CERTIFICATE OF CORRECTION

Patent No. 3,673,180           Dated June 27, 1972

Inventor(s) Glen E. Arth and Gary H. Rasmusson

It is certified that error appears in the above-identified patent and that said Letters Patent are hereby corrected as shown below:

Columns 9 and 10 should read as follows:

9 of 30 percent aqueous H₂O₂ is added. The mixture is allowed to stand overnight at room temperature. The reaction is quenched by dilution with water and the tetrahydrofuran is evaporated under vacuum. The residue is crystallized, filtered, and purified. 2.4 G. of 3-methoxyestra-1,3,5(10),14-tetraen-17α-(3'-hydroxypropyl)-17β-ol is recovered. The product is used in the next step without further identification.

EXAMPLE 17
3-Methoxyestra-2,5(10),14-trien-17α-(3'-hydroxypropyl)-17β-ol

To a dry flask equipped with a Dry Ice condenser and magnetic stirrer device under a $N_2$ atmosphere is added 0.5 g. of the steroid (prepared in Example 16) suspended in 7 ml. of t-butanol and 7 ml. of diethyl ether. 20 Ml. of anhydrous liquid ammonia is added to the flask. Sufficient solid lithium wire is then added to turn the solution dark blue. The mixture is refluxed for 3-4 hours. Methanol is added to quench the reaction and the ammonia allowed to evaporate overnight under the $N_2$ stream. At this point, 25 ml. of water and 25 ml. of diethyl ether is added to the reaction flask. The mixture is extracted with methylene chloride, washed with water, dried and evaporated. A white crystalline powder melting at 156°-158° C. is recrystallized from methanol, which is identified as 3-methoxyestra-2,5(10),14-trien-17α-(3'-hydroxy-propyl)-17β-ol.

EXAMPLE 18
Estra-4,14-dien-17α-(3'-hydroxypropyl)-17β-ol-3-one

100 Mg. of the powder prepared in Example 17 is suspended in 3.3 ml. of ethanol in a separate reaction flask. 0.4 Ml. of a 2.5 N hydrochloric acid solution is then added and the reaction stirred at room temperature. After 24 hours, it is neutralized with aqueous sodium bicarbonate. The ethanol is removed by evaporation and the residue is crystallized, filtered, and dried, and the product was identified as estra-4,14-dien-17α-(3'-hydroxypropyl-17β-ol-3-one, m.p. 185°-187° C.

EXAMPLE 19
19-Nor-20-spiroxa-4,14-dien-3-one

820 Mg. of the diol prepared in Example 18 is dissolved in 8 cc. of pyridine and cooled to 0° C. To this solution is added 820 mg. of p-toluenesulfonyl chloride and the mixture stirred at room temperature overnight. The solution is diluted slowly with water and an oily substance is separated. This oil, after extraction with ethyl acetate and washing with water, is dried and evaporated yielding 731 mg. of a dark oil. The oil is purified by thin layer chromatography on a silica gel with a 2 percent methanol/chloroform eluant. The product is taken up in benzene and recrystallized from a 10 percent ethanol/benzene mixture. Mass spectograph analysis indicates that the product, 19-nor-20-spiroxa-4,14-dien-3-one, is prepared, melting at 72°-74° C.

10

EXAMPLE 20
3-Methoxy-19-nor-20-spiroxa-1,3,5(10),14-tetraene

800 Mg. of the diol prepared in Example 16 is dissolved in 8 cc. of pyridine and cooled to 0° C. To this solution is added 800 mg. of p-toluenesulfonyl chloride and the mixture stirred at room temperature overnight. The solution is then diluted with water. The crude product is recovered as an oil, which after purification and recrystallization, is identified as 3-methoxy-19-nor-20-spiroxa-1,3,5(10),14-tetraene.

EXAMPLE 21
19-Nor-20-spiroxa-4,14-dien-3-one

The product prepared in Example 20 is treated with anhydrous ammonia and solid lithium in t-butanol following the procedure of Example 17. The product obtained is 19-nor-20-spiroxa-3-methoxy-2,5(10),14-triene. This latter product is then treated with acid following the procedure of Example 18 to yield the 19-nor-20-spiroxa-4,14-dien-3-one final product, m.p. 72°-74° C.

What is claimed is:
1. A compound having the formula

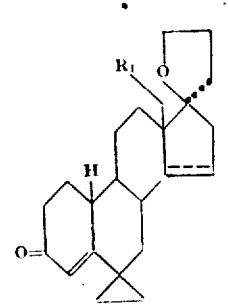

wherein the broken line indicates an optional double bond, and $R_1$ is either H or $CH_3$.

2. The compound of claim 1 which is 19-nor-20-spirox-6,6-ethylene-4-en-3-one.

3. The compound which is 19-nor-20-spirox-6,6-ethylene-4,14-dien-3-one.

Page 1 of two pages

UNITED STATES PATENT OFFICE
CERTIFICATE OF CORRECTION

Patent No. 3,673,180                    Dated June 27, 1972

Inventor(s) Glen E. Arth and Gary H. Rasmusson

It is certified that error appears in the above-identified patent and that said Letters Patent are hereby corrected as shown below:

(Column 10 continued)

4. A compound having the formula

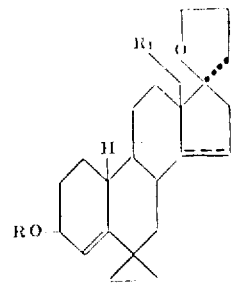

wherein R is hydrogen, loweralkyl having one to six carbon atoms, loweralkanoyl having one to six carbon atoms, tetrahydropyranyl, or tetrahydrofuranyl, $R_1$ is either H or $CH_3$, and the broken line indicates an optional double bond.

5. The compound of claim 4 which is 6,6-ethylene-19-nor-20-spirox-4-en-3-OR, where R is hydrogen, loweralkyl having one to six carbon atoms, loweralkanoyl having one to six carbon atoms, tetrahydropyranyl, or tetrahydrofuranyl.

6. The compound which is 6,6-ethylene-19-nor-20-spirox-4,14-dien-3-OR, where R is hydrogen, lower alkyl having one to six carbon atoms, loweralkanoyl having one to six carbon atoms, tetrahydropyranyl, or tetrahydrofuranyl.

7. The compound of claim 4 wherein R is hydrogen.
8. The compound of claim 4 wherein R is methyl.
9. The compound of claim 4 wherein R is acetyl.
10. The compound of claim 4 wherein R is tetrahydropyranyl.

UNITED STATES PATENT OFFICE
CERTIFICATE OF CORRECTION

Patent No. 3,673,180     Dated June 27, 1972

Inventor(s) Glen E. Arth et al.     - 3 -

It is certified that error appears in the above-identified patent and that said Letters Patent are hereby corrected as shown below:

Signed and sealed this 13th day of February 1973.

(SEAL)
Attest:

EDWARD M.FLETCHER,JR.                ROBERT GOTTSCHALK
Attesting Officer                    Commissioner of Patents